March 21, 1967  A. W. ROBINS ETAL  3,310,262
SUPERSONIC AIRCRAFT

Filed May 21, 1965  2 Sheets-Sheet 1

INVENTORS
AUGUSTINE W. ROBINS
ROY V. HARRIS, JR.
HARRY W. CARLSON
FRANCIS E. McLEAN
WILBUR D. MIDDLETON

BY

ATTORNEYS

March 21, 1967 A. W. ROBINS ET AL 3,310,262
SUPERSONIC AIRCRAFT
Filed May 21, 1965 2 Sheets-Sheet 2

INVENTORS
AUGUSTINE W. ROBINS
ROY V. HARRIS, JR.
HARRY W. CARLSON
FRANCIS E. McLEAN
WILBUR D. MIDDLETON

BY

ATTORNEYS

United States Patent Office 3,310,262
Patented Mar. 21, 1967

3,310,262
SUPERSONIC AIRCRAFT
Augustine W. Robins, Yorktown, Roy V. Harris, Jr., and Harry W. Carlson, Newport News, Francis E. McLean, Hampton, Va., and Wilbur D. Middleton, Bellevue, Wash., assignors to the United States of America as represented by the Administrator of the National Aeronautics and Space Administration
Filed May 21, 1965, Ser. No. 457,876
8 Claims. (Cl. 244—45)

The invention described herein may be manufactured and used by or for the Government of the United States of America for governmental purposes without the payment of any royalties thereon or therefor.

This invention relates generally to aerial vehicles, and relates with particularity to supersonic aircraft having fixed substantially arrow-wing planform configurations and considered to be particularly useful for application to civilian and military transport or military surveillance and bombardment aircraft, having supersonic speed capabilities.

Two major plans have been undertaken in an effort in this country to develop an optimum supersonic aircraft configuration. One of these plans involves the use of fixed wing aircraft and the other a variable wing sweep aircraft in which the inflight variation of wing planform geometry, with simultaneous variation of both wing sweep and aspect ratio being accomplished by the inflight variation of the wing planform, permitting the design of an aircraft having both efficient subsonic capabilities, and adequate supersonic performance. United States Letters Patent No. 3,064,928 issued to Thomas A. Toll on Nov. 20, 1962; No. 3,087,692 issued to John G. Lowry on Apr. 30, 1963; No. 3,053,484 issued to William J. Alford, Jr., and Edward C. Polhamus on Sept. 11, 1962; and No. 3,104,082 issued Sept. 17, 1963, to Edward C. Polhamus are exemplary patents employing the variable sweep concept, each of these referenced patents being assigned to the National Aeronautics and Space Administration. Although each of the referenced patent devices is quite adequate for the purposes intended, due to the inherent complexities of wing sweep mechanism involved in any large aircraft, and the critical location and design of wing pivot points, research for a fixed wing aircraft having potentially superior supersonic flight capabilities has also been undertaken.

Accordingly, it is an object of the present invention to provide a new and novel aircraft having a fixed wing capable of attaining superior supersonic flight performance and adequate low-speed, subsonic take-off and cruise flight capabilities.

A further object of the present invention is to provide a new and improved fixed, swept-wing planform for an aircraft.

Another object of the instant invention is the provision of a new and improved supersonic aircraft configuration.

Another object of the present invention is a novel supersonic aircraft configuration utilizing wing areas of receding slope to provide maximum utilization of the inherent nacelle-wing airflow interference.

A further object of the present invention is to provide a new and improved fixed wing planform in which a twisted and cambered wing is utilized for maximizing supersonic flight efficiency.

Yet another object of the present invention is a new and novel aircraft configuration in which the wing fuselage-nacelle combination is self-trimming and the drag-due-to-lift is considerably lower than that of a low-sweep flat wing configuration of conventional aircraft.

According to the present invention, the foregoing and other objects are attained by providing, in an aircraft, a fuselage having a positive cambered area at the forward end thereof and terminating in a conical point at the aft end thereof, twisted and cambered wings connected to each side of said fuselage, and including a notched surface in the wing leading edge, fixed vertical stabilizer surfaces projecting upwardly from outboard stations on the wings, and a pair of engine nacelles fixedly attached beneath the trailing edge of each wing with the trailing edge of the wing adjacent the nacelle bodies being reflexed so as to provide maximum beneficial aerodynamic interference between the wing and nacelle combination.

A more complete appreciation of the invention and many of the attendant advantages thereof will be readily apparent as the same becomes better understood by reference to the following detailed description when considered in connection with the accompanying drawings wherein.

Figure 2:
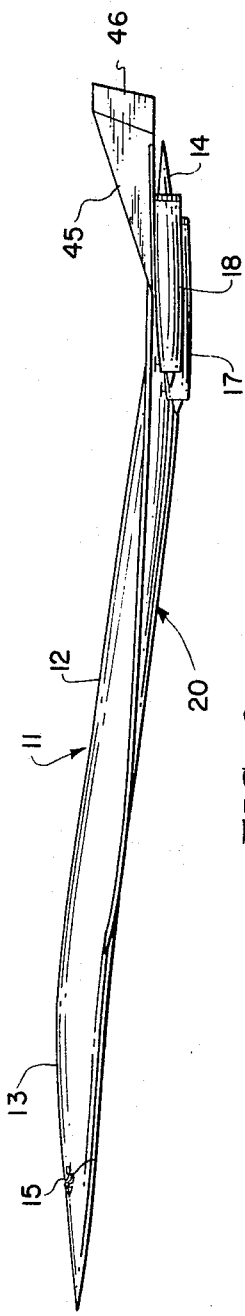
FIG. 2 is a side elevational view of the aircraft as shown in FIG. 1.

Referring now more particularly to the drawing wherein like reference numerals designate identical parts throughout the several views, there is shown a fixed swept-wing planform aircraft, generally designated by reference numeral 11. Aircraft 11 is provided with a fuselage 12 having a length to equivalent diameter, or fineness ratio, suitable for supersonic flight, and including a positive cambered area 13 at the forward end thereof and terminating in a right-circular conical point 14 at the aft end thereof. A suitable control compartment or pilot's cabin 15 is also included in the forward cambered area 13 of fuselage 12.

Aircraft 11 is provided with a wing, generally designated by reference numeral 20, projecting substantially horizontally outward from each side of the fuselage 12 aft of forward cambered area 13 and terminating forward of conical tip 14. As will be further explained hereinafter, a pair of engine nacelles 17 and 18 are disposed on each side of fuselage 12 and fixedly attached to wing 20.

Figure 3:
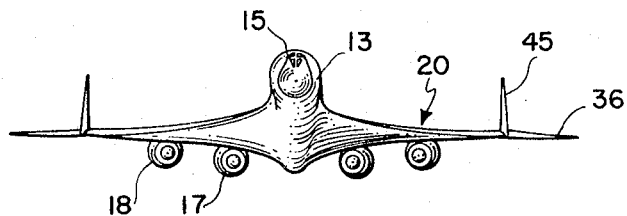
FIG. 3 is a front elevational view of the aircraft as shown in FIG. 1.

Aircraft 11, as shown more particularly in FIGS. 2 and 3, is of the arrow, long-wing type, with the lower surface of wings 20 being substantially flush with the bottom surface of fuselage 12, although mid- and high-wing arrangements are also considered to fall within the scope of the present invention.

Wing 20 includes an inner wing section including port and starboard wing panels 22 fixedly interconnected with fuselage 12 with each panel 22 being provided with forwardly disposed flaps 21 extending along a substantial length of the swept leading edges 25 thereof. Each wing panel 22, referring to the area thereof projecting outwardly from a side of fuselage 12, includes a root section 23 adjacent the side of fuselage 12 and a tip 24 disposed outboard of the root section 23. The forward extremity of root section 23, of each wing panel 22, is positioned somewhat aft of the forward cambered area 13 of fuselage 12 and forward of the longitudinal mid-point station of fuselage 12. The spanwise length of each wing panel 22 between the root section 23 and the tips 24 thereof is on the order of about four times the maximum width of fuselage 12.

Each wing panel 22 includes a leading edge 25 swept back at an angle on the order of about seventy-four degrees which connects the forward extremities of root section 23 and tip 24 thereof, and a trailing edge 26 connecting the aft extremities of the root and tip sections. Trailing edge 26 commences at the root section in a forward arc and fairs into an after sweep straight section on an angle of the order of 45°.

Rearwardly positioned hinged flaps 29, 30, and 31 are disposed on the trailing edge of each fixed wing panel 22 and are movably interconnected with the remainder of panel 22 for utilization as aircraft control surfaces. Accordingly, each section 29, 30, and 31 includes a trailing edge, which coincides with substantially the entire length of the trailing edge 26 of wing panel 22; and side edges, not designated, positioned, respectively, substantially adjacent the root section 23, tip area 24, and the engine nacelles 17 and 18, and which are separable from the fixed structure of panel 22; and a forward edge 29', 30' and 31'. Each section 29, 30, and 31 is hingedly connected along respective edges 29', 30', and 31' to wing panel 22 to provide aircraft control surfaces, in a conventional manner, and conventional actuator means, not shown, are provided for rotating the sections 29, 30, and 31 in either an upwardly or downwardly direction in unison to provide aircraft pitching control.

An outboard wing panel, or tip section 36, is integrally secured to each inner wing panel at tip 24 thereof. The leading edge 37 of each outboard panel 36 extends outwardly and rearwardly from the point at which panel 36 connects with panel 22 at a sweep angle of approximately 65° to thereby provide a notched leading edge continuation of leading edge 25 of panel 22. Each wing panel 36 is also provided with a straight trailing edge 38 which extends outwardly and rearwardly from the trailing edge of panel 22 at a sweep angle of approximately 29°. These sweep angles of the leading and trailing edges of panels 36, however, may be varied as found desirable. Each wing panel 36 is also provided with a tip 39 which, by way of example, may run rearwardly from the leading edge 37, parallel to the aircraft longitudinal centerline, to the trailing edge 38, although other suitable tip arrangements are considered to be within the scope of the invention.

The outermost extremities of the wing 20 occur generally at the intersection of the outboard panel tip sections 39 at the trailing edge 38 with these points being substantially on a line with a plane taken along the outer extremities and the conical tip 14 of fuselage 12. Each outboard wing panel 36 is further provided with a conventional aileron rolling control surface 41 positioned along substantially the entire length of the trailing edge 38 thereof, with conventional actuation means, not shown, being provided therefor.

Each wing 20 of aircraft 11 also includes a pair of vertical fin, or tail stabilizers integrally connected to the main wing panel 22 and outboard wing panel 36 at the notched inner connection thereof. Stabilizer tails 45 are located outboard sufficiently on wing 20 to remove them from the presence of the fuselage vortex and located in a region of favorable sidewash during aircraft flight so as to provide a minimum surface area being employed to provide adequate directional control.

Figure 1:
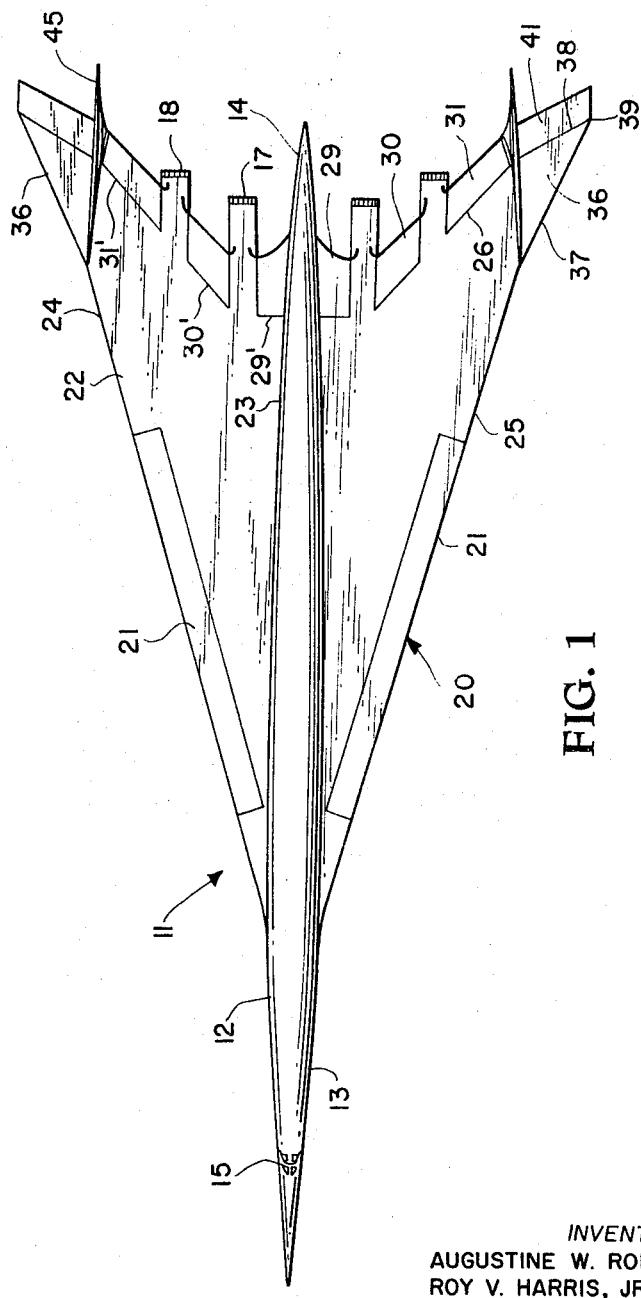
FIG. 1 is a plan view of a fixed wing supersonic aircraft configuration according to the present invention.

As more clearly shown in FIG. 1, vertical fins 45 are canted in the aft direction toward the longtiudinal center of fuselage 12 to thereby utilize the local flow fields and produce improved lift-drag ratio characteristics for aircraft 11. Each vertical fin 45 is provided with a conventional rudder 46, FIG. 2, positioned along substantially the entire length of the trailing edge thereof, with conventional actuating means, not shown, provided therefor.

Figure 4:
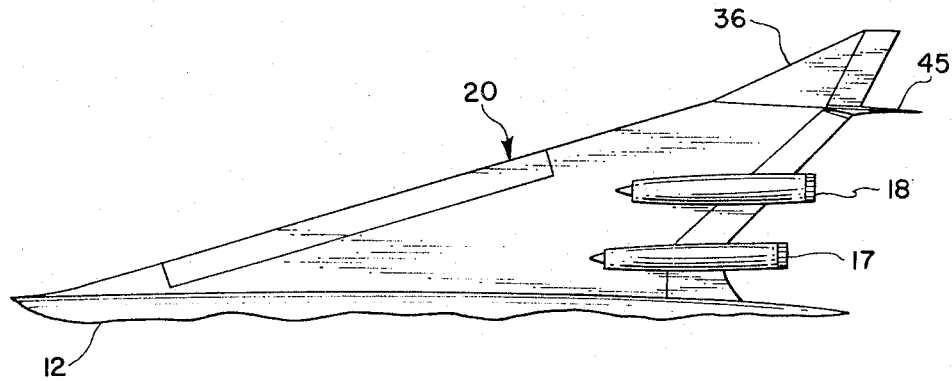
FIG. 4 is a partial plan view of the aircraft illustrating the wing-fuselage-nacelle combination.
Figure 5:
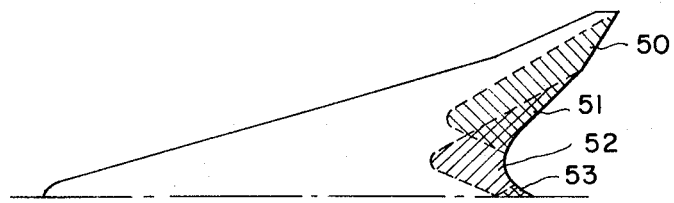
FIG. 5 is a schematic illustration of the areas of wing reflex as are provided on the aircraft shown in FIGS. 1–4.

Referring now more particularly to FIGS. 4 and 5, the novel trailing edge reflex characteristics of wing 20 will now be described. As mentioned hereinbefore, each wing 20 is provided with an inboard engine nacelle 17 and an outboard engine nacelle 18 located beneath wing 20. Because nacelles 17 and 18 are located beneath the wing, there is at cruise lift coefficients, a precompression, reducing the Mach number in the area of the nacelles. Taking the average of the wing slopes, at cruise lift, at the inoboard and outboard nacelles stations, and assuming two-dimensional flow, a Mach number of 2.5 is found. An equivalent-body having the same area distribution as nacelles 17 and 18 would thus be found to show shock traces on the wing-camber plane, as schematically illustrated for a flat plate in FIG. 5, and designated by reference numerals 50, 51, 52, and 53. As apparent from FIG. 5, outboard nacelle 18 influences areas 50 and 51 while the inboard engine nacelle 17 influences areas 51, 52, and 53. Thus, areas 51 and 53 on wing 20 are influenced by two nacelles. Using any of several known methods, interference lift values for each nacelle may be readily calculated, and the interference lift coefficient and the reflex angles for each increment of interference areas 50, 51, 52 and 53 is readily determined. With respect to the original surface of wing 20, the following table of values from the utilization of total, rather than incremental interference calculations, with the area or region notations being those shown schematically in FIG. 5, are found:

| Region of wing: | Reflex angle, degrees |
| --- | --- |
| 50 | 1.247 |
| 51 | 2.681 |
| 52 | 1.434 |
| 53 | 2.868 |

Use of incremental interference calculations (for example, method of characteristics) would yield a similar line but not a constant angle.

In the application of these tabulated reflex angles, the lines defining the forward boundary of each interference region makes the points at which each chordwise cambered line in the region is sharply reflexed, or bent upward, the amount specified. The points of reflex are faired to provide for a smooth surface, and since the changes in slope due to reflexing are small, very little fairing is required.

The reflex areas 50, 51, 52, and 53 thus provide areas of receding slope along the underneath surface of wing 20 to thereby favorably utilize the inherent nacelle-wing interference flow pattern as would be experienced in flight of aircraft 11.

From the foregoing description, it is readily apparent that applicants have developed an aircraft employing a new aerodynamic concept in which wing-reflex is employed to fully exploit favorable component interference flow. Thus, the present invention utilizes the wing-fuselage-nacelle combination such that the components are self-trimming and that the drag at cruise lift for aircraft 11 is considerably lower than that of the normal low-sweep and variable sweep supersonic aircraft. Thus, vertical tail surfaces 45, engine nacelles 17 and 18, the trailing notch on aircraft 11, and the twist and camber of wing 20 all contribute to increasing the ratio of lift-to-drag for aircraft 11. More specifically, each component of the aircraft is so designed as to contribute to an increase of the ratio of lift-to-drag. As apparent from the foregoing description, aircraft 11 utilizes vertical tail surfaces 45, located in a region of high effectiveness so as to be minimized or such that their drag is reduced. Engine nacelles 17 and 18 are favorably located beneath and rearward on wing 20.

Engine nacelles 17 and 18 are provided with a substantially tapered configuration with the exit or base area thereof exceeding the capture area. As shown more particularly in FIG. 3, engine nacelles 17 and 18 are slightly canted inwardly toward the longitudinal center of fuselage 12 so as to assist in the beneficial lift interference produced by each nacelle. A trailing edge notch is provided on aircraft 11 so as to reduce the low-grade lifting surface falling in the downwash of the wing. The majority of the wing leading edge is subsonic. Wing 20 is cambered and twisted so as to provide the least drag at trim flight at the design Mach number. Each of these components of the aircraft 11 act favorably together to provide for maximum beneficial aerodynamic interference and to thereby produce a new and novel aircraft configuration.

Vertical tails 45 are located outboard on wing 20 and disposed at an angle on wing 20 equal to half the local sidewash to thereby minimize the drag from tails 45 as well as to delay flow separation in the wing-tip region at both high and low speed flight for aircraft 11. The placement of engine nacelles 17 and 18 beneath and aft on wing 20 is primarily dictated by consideration of the lift-drag interference and to utilize the novel feature of wing reflexing to favorable advantage. In order that the wing-fuselage-nacelle combination be self-trimming, it is essential that wing 20 be warped or twisted to the proper degree with the wing warp being integrated with the fuselage design. The methods by which the wing 20 was warped are defined in NASA TN's 2341 and 2570 by Messers. Carlson and Middleton, co-inventors herein.

The present invention eliminates the normal fuselage-forebody lift and the consequent fuselage crossflow at the wing-fuselage juncture inasmuch as this crossflow tends to greatly exceed the design values of local upwash at the root leading edge. The direct upwash at the wing root is a matter of critical importance since the lifting of a wing is critically dependent, for the establishment and spanwise growth of the proper upwash along the wing leading edge on the initiation of proper upwash at that root leading edge. Thus, the fuselage forebody must aline with the freestream at the cruise lift-coefficient. It was for this and other reasons that the wing planform of the present invention is made blunted, or parabolic, and a forebody droop or warp initiating at the apex of the modified arrow wing configuration is provided.

Since it is desirable to utilize the "area rule" concept in the design of supersonic aircraft, and for advantageous structural reasons, the maximum thickness points of the more inboard chords are distributed rearward on wing 20. Under these circumstances, in order to prevent high aft-facing slopes and a consequent increase in wave drag, the inboard trailing edges are positioned rearwardly to thereby produce the arcuate trailing edge on body 29 of wing 20 as shown more specifically in FIG. 1.

The actual wing camber-plane for aircraft 11 as mentioned hereinbefore, was arrived at through the use of Langley Research Center computer programs based on NASA TN D2341 and NASA TN D2570 by Carlson and Middleton. The resulting camber-plane shape thus provides a low drag-due-to-lift-factor and provides that the wing be self-trimming. By selecting the required design-lift coefficient, or degree of wing warp, self-trimming of aircraft 11 is readily accomplished. As apparent to those skilled in the art, the effect of wing warp on trimmed lift-drag ratio, or the measure of airframe flight efficiently at any given Mach number, is profound. That is, as you depart from neutral stability, or where the static margin is zero, toward any appreciable positive stability, or a negative static margin, the warped wing is markedly superior to a flat wing configuration. This aerodynamic principle is used advantageously in the design of the present invention.

Also as apparent from the foregoing description, the reflex wing configuration provides not only a lower upper-surface slope of the rearward portions of the wing, with an attendant reduction in the upper-surface drag, but also higher lower-surface slopes so as to better facilitate nacelle-wing drag cancellation.

Obviously, many modifications and variations of the present invention are possible in the light of the above teachings. It is to be understood, therefore, that the foregoing disclosure relates only to a specific embodiment of the invention, and that numerous modifications, variations and uses of the present invention are possible in the light of the above teachings, as will be readily apparent to those skilled in the art, without departing from the spirit and scope of the present invention, as set forth in the appending claims.

What is claimed and desired to be secured by Letters Patent of the United States is:

1. An aircraft having supersonic flight capabilities and comprising:
   a fuselage having a fineness ratio suitable for supersonic flight, said fuselage being provided with a positive camber area at the forward end thereof and terminating at the aft end thereof in a right circular conical tip,
   a twisted and cambered wing connected to each side of said fuselage and projecting substantially horizontally and outwardly therefrom,
   each said wing including:
      (a) a main wing panel having a root, a swept leading edge and a trailing edge,
      (b) an outboard wing panel integrally secured to said main wing panel and having a swept leading and swept trailing edge forming angular continuations of the leading and trailing edges of said main wing panel so as to provide a notched leading edge and angular trailing edges for the wing, and
      (c) a vertical fin integrally secured to said wing along the intersection of said main wing panel and said outboard wing panel with said fin being slightly canted in the aft direction toward the longitudinal center of said fuselage.

2. The aircraft of claim 1 wherein said root and said trailing edge of said main wing panel merge with said fuselage at a point forwardly disposed from said conical tip,
   a pair of spaced engine nacelles disposed on each said main wing panel,
   said main wing panel being reflexed at points disposed chordwise along the wing camber line in the region of nacelle interference so as to provide maximum beneficial interference between said wing and said nacelles to thereby increase the lift-to-drag ratio for said aircraft.

3. The aircraft of claim 2 wherein the interference area for each said nacelle determines the locus of points at which reflex originates and said reflex points are faired to provide maximum smoothness for said wing panel.

4. The aircraft of claim 1 wherein said trailing edge of said main wing panel includes a swept portion and an arcuate portion, said swept portion merging with the trailing edge of said outboard wing panel and said arcuate portion merging with said root at the fuselage at a point spaced forwardly from the conical tip of said fuselage,
   said trailing edge of said main wing panel being further provided with an area of receding slope along the surface thereof to favorably utilize the nacelle-wing interference flow pattern.

5. The aircraft of claim 1 including:
   a pair of spaced engine nacelles disposed on the trailing edge of each of said main wing panel,
   said trailing edge being reflexed to provide appropriate regions of receding slope, and
   said regions being so constructed and arranged as to provide maximum utilization of the inherent nacelle-wing airflow interference.

6. An aircraft having supersonic flight capabilities comprising:
   a fuselage having a fineness ratio suitable for supersonic flight, said fuselage being provided with a positive cambered area at the forward end thereof and terminating in a conical point at the aft end thereof,
   a wing connected to each side of said fuselage aft of said cambered area and projecting substantially horizontally and outwardly therefrom, the root of said wings terminating forward of said fuselage conical point, each of said wings including:

(a) a twisted and cambered main wing panel having a swept leading edge constructed and arranged so that the leading edge is swept behind the Mach line at a Mach number as high as 3.5, and (b) an outboard wing panel integrally secured to said main wing panel and having a leading angular sweep relative to said main wing panel so as to form a notched intersection along the wing leading edge where said main wing panel and said outboard wing panel connect, a vertical tail extending from the intersection of said main wing panel and said outboard wing panel, said vertical tail being angularly disposed relative to the longitudinal center of said fuselage, an inboard and an outboard engine nacelle fixedly located beneath and along the trailing edge of said wing, said engine nacelles being so constructed and arranged so as to reduce the Mach number in the area of the nacelles and provide interference lift along the trailing edge of said wing due to the inherent nacelle-wing interference compression flow, said wing trailing edge being provided with appropriate receding slopes, said receding slopes being faired to provide a smooth airfoil surface in the region of interference lift.

7. An aircraft having a supersonic atmospheric flight capability comprising:

a fuselage having a fineness ratio suitable for supersonic flight, said fuselage including means for minimizing the wetted area and to reduce the frontal area thereof, said fuselage also being cambered in the vertical plane to provide an optimum flow over the cambered area, a wing carried by said fuselage and being provided with a substantially arrow planform having a leading edge swept aft of the Mach line of the aircraft for a design Mach number as high as 3.5, said wing including a main inboard panel fixedly connected to each side of said fuselage, said main panel being twisted and cambered and projecting substantially horizontally and outwardly from said side of said fuselage, a tip wing panel integrally connected to said main wing panel, said tip wing panel being provided with a leading edge sweep less than that of said main panel so as to provide a substantially notched surface in the wing arrow planform, a stabilizer tail member vertically extending and integrally connected to said main wing panel and said tip wing panel at the notched interconnection thereof, said vertical stabilizers being located outboard sufficiently on the main wing panel to thereby remove them from the presence of the fuselage vortex and being located in a region of favorable sidewash to thereby provide a minimum surface area employed to provide adequate directional control, said vertical stabilizers being canted in the aft direction toward the longitudinal center of said fuselage to utilize the local flow fields and produce improved lift-drag ratio characteristics, and longitudinal control means located on the trailing edge of said wing.

8. An aircraft according to claim 7 and including:

an inboard and an outboard engine nacelle fixedly located beneath and along the trailing edge of said wing, said engine nacelles being so constructed and arranged as to reduce the Mach number in the area of the nacelles and provide interference lift along the trailing edge of said wing due to the inherent nacelle-wing interference compression flow.

References Cited by the Examiner

Jane's All The World's Aircraft (1964–65), John W. R. Taylor (editor), 1964, pp. 250–268.

FERGUS S. MIDDLETON, *Primary Examiner.*

B. BELKIN, *Assistant Examiner.*